(12) United States Patent
Teng et al.

(10) Patent No.: US 8,226,287 B2
(45) Date of Patent: Jul. 24, 2012

(54) LIGHT GUIDE PLATE AND BACKLIGHT MODULE

(75) Inventors: Tun-Chien Teng, Hsin-Chu (TW);
Jyh-Ming Chen, Hsin-Chu (TW);
Ming-Feng Kuo, Hsin-Chu (TW);
Chih-Jen Tsang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 510 days.

(21) Appl. No.: 12/613,522

(22) Filed: Nov. 5, 2009

(65) Prior Publication Data
US 2010/0290252 A1 Nov. 18, 2010

(30) Foreign Application Priority Data
May 14, 2009 (TW) .............................. 98116017 A

(51) Int. Cl.
*F21V 7/04* (2006.01)
(52) U.S. Cl. .................... 362/625; 362/615; 362/623
(58) Field of Classification Search ........ 362/97.1–97.3, 362/600, 606, 607, 615, 616, 621, 623, 625, 362/628, 231, 255
See application file for complete search history.

(56) References Cited

U.S. PATENT DOCUMENTS

| 7,364,341 | B2 | 4/2008 | Parker et al. | |
| 7,532,800 | B2 * | 5/2009 | Iimura | 385/146 |
| 7,543,973 | B2 * | 6/2009 | Shimura | 362/619 |

* cited by examiner

*Primary Examiner* — Vip Patel
(74) *Attorney, Agent, or Firm* — Jianq Chyun IP Office

(57) ABSTRACT

A light guide plate capable of guiding a light beam from a light emitting device and a backlight module using the light guide plate are provided. The light guide plate includes a light-transmissive substrate and optical structures. The light-transmissive substrate has a first surface, an opposite second surface, and an incident surface connecting the first and the second surface. The light beam enters the light-transmissive substrate through the incident surface and is emitted out of the light-transmissive substrate through the first surface. The optical structures are disposed on the second surface. Each optical structure has a first total internal reflection (TIR) surface, a second TIR surface, and a third TIR surface. The second TIR surface connects the first and third TIR surfaces. Part of the light beam from the incident surface is totally internally reflected by any adjacent two of the first, second, and third TIR surfaces in sequence.

20 Claims, 14 Drawing Sheets

LIGHT GUIDE PLATE AND BACKLIGHT MODULE

CROSS-REFERENCE TO RELATED APPLICATION

This application claims the priority benefit of Taiwan application serial no. 98116017, filed on May 14, 2009. The entirety of the above-mentioned patent application is hereby incorporated by reference herein and made a part of specification.

BACKGROUND OF THE INVENTION

1. Field of the Invention

The invention generally relates to an optical device and a backlight module, and more particularly, to a light guide plate and a side type backlight module.

2. Description of Related Art

In recent years, liquid crystal display (LCD) has been broadly applied in our daily life along with the rapid development of flat panel display techniques. LCD has gradually replaced the conventional cathode ray tube (CRT) due to its many advantages such as light weight, small volume, low power consumption, and small thickness.

An LCD has a liquid crystal panel and a backlight module, wherein the backlight module is disposed behind the liquid crystal panel to provide a surface light source for the liquid crystal panel. A backlight module may be categorized as a direct type backlight module or a side type backlight module according to the disposed positions of light emitting devices thereof. In a side type backlight module, a light guide plate is disposed for guiding the light beams emitted by light emitting devices disposed at one side of the light guide plate, so as to provide a surface light source to the liquid crystal panel. Besides, a backlight module may also be categorized as a light emitting diode (LED) backlight module or a cold cathode fluorescent lamp (CCFL) backlight module according to the type of light emitting devices adopted therein.

In a side type backlight module having a plurality of LEDs as its light emitting devices, the LEDs are disposed beside an incident surface in the light guide plate, and the LEDs are arranged on a straight line and are kept away from each other. The LEDs emit a plurality of light beams, wherein the light beams enter the light guide plate through the incident surface of the light guide plate. Because the LEDs have higher directivity (i.e., have a limited light emitting angle range), bright regions are formed in the light guide plate within the light emitting angle range and close to the LEDs, and dark regions are formed in the light guide plate outside of the light emitting angle range. The light guide plate may not be able to provide a uniform surface light source due to the existence of these bright and dark regions, and this is referred to as the "hot spot" phenomenon. Along with the constant increase of LED power in recent years, the number of LEDs disposed at one side of the incident surface in the light guide plate is reduced. However, since fewer LEDs are disposed, the space between every adjacent two LEDs is increased. As a result, the surface areas of the dark regions are increased, and accordingly the surface light source becomes even more uneven and the problem of hot spot is worsened.

SUMMARY OF THE INVENTION

Accordingly, the invention is directed to a light guide plate able to effectively resolve the problem of hot spot.

The invention is also directed to a backlight module able to provide a uniform surface light source.

According to an embodiment of the invention, a light guide plate capable of guiding a light beam emitted by at least one light emitting device is provided. The light guide plate includes a light-transmissive substrate and a plurality of optical structures. The light-transmissive substrate has a first surface, a second surface opposite to the first surface, and an incident surface connecting the first surface and the second surface. The light beam from the light emitting device is capable of entering the light-transmissive substrate through the incident surface and is capable of being emitted out of the light-transmissive substrate through the first surface. The optical structures are disposed on the second surface. Each of the optical structures has a first total internal reflection (TIR) surface, a second TIR surface, and a third TIR surface, wherein the second TIR surface connects the first TIR surface and the third TIR surface. A first normal vector of the first TIR surface passing through a geometric center thereof forms an angle $\theta1$ with the second surface, a second normal vector of the second TIR surface passing through a geometric center thereof forms an angle $\theta2$ with the second surface, and a third normal vector of the third TIR surface passing through a geometric center thereof forms an angle $\theta3$ with the second surface, wherein the first TIR surface meets $25° \leq \theta1 \leq 65°$, the second TIR surface meets $25° \leq \theta2 \leq 65°$, and the third TIR surface meets $25° \leq \theta3 \leq 65°$. An orthogonal projection vector of the first normal vector on the second surface forms an angle $\phi1$ with an orthogonal projection vector of the second normal vector on the second surface, the orthogonal projection vector of the second normal vector on the second surface forms an angle $\phi2$ with an orthogonal projection vector of the third normal vector on the second surface, wherein the first TIR surface and the second TIR surface meet $0 < \phi1 \leq 30°$, and the second TIR surface and the third TIR surface meet $0 < \phi2 \leq 30°$. A part of the light beam from the incident surface is capable of being totally internally reflected by any adjacent two of the first TIR surface, the second TIR surface, and the third TIR surface in sequence.

According to another embodiment of the invention, a backlight module including two light emitting devices and an aforementioned light guide plate is provided. Each of the light emitting devices is capable of emitting a light beam, and the light guide plate is disposed in the transmission path of the light beams. The light beams from the light emitting devices are capable of entering a light-transmissive substrate through an incident surface, and a part of the light beams from the incident surface is capable of being totally internally reflected by any adjacent two of a first TIR surface, a second TIR surface, and a third TIR surface in sequence.

As described above, the embodiment or the embodiments of the invention may have at least one of the following advantages. In the light guide plate according to the embodiment of the invention, a plurality of optical structures is disposed, and the first TIR surface, the second TIR surface, and the third TIR surface of each of the optical structures are disposed within a specific angle range so that a part of the light beams from the incident surface is totally internally reflected by any adjacent two of the first TIR surface, the second TIR surface, and the third TIR surface in sequence. Accordingly, the optical structures allow the part of the light beams to bounce back to the areas in the light guide plate and the areas close to the incident surface are at both sides of the optical axes of the light emitting devices, so that the problem of hot spot may be effectively resolved and the uniformity of the surface light source provided by a backlight module using the light guide plate may be improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Additionally, in the present specification, the normal vector on a surface of an object is defined as a vector perpendicular to the surface and pointing from inside of the object toward outside of the object. Moreover, the angle formed by a vector and a surface is defined as the angle formed by the vector and the orthogonal projection vector of the vector on the surface.

First Embodiment

Figure 1A:
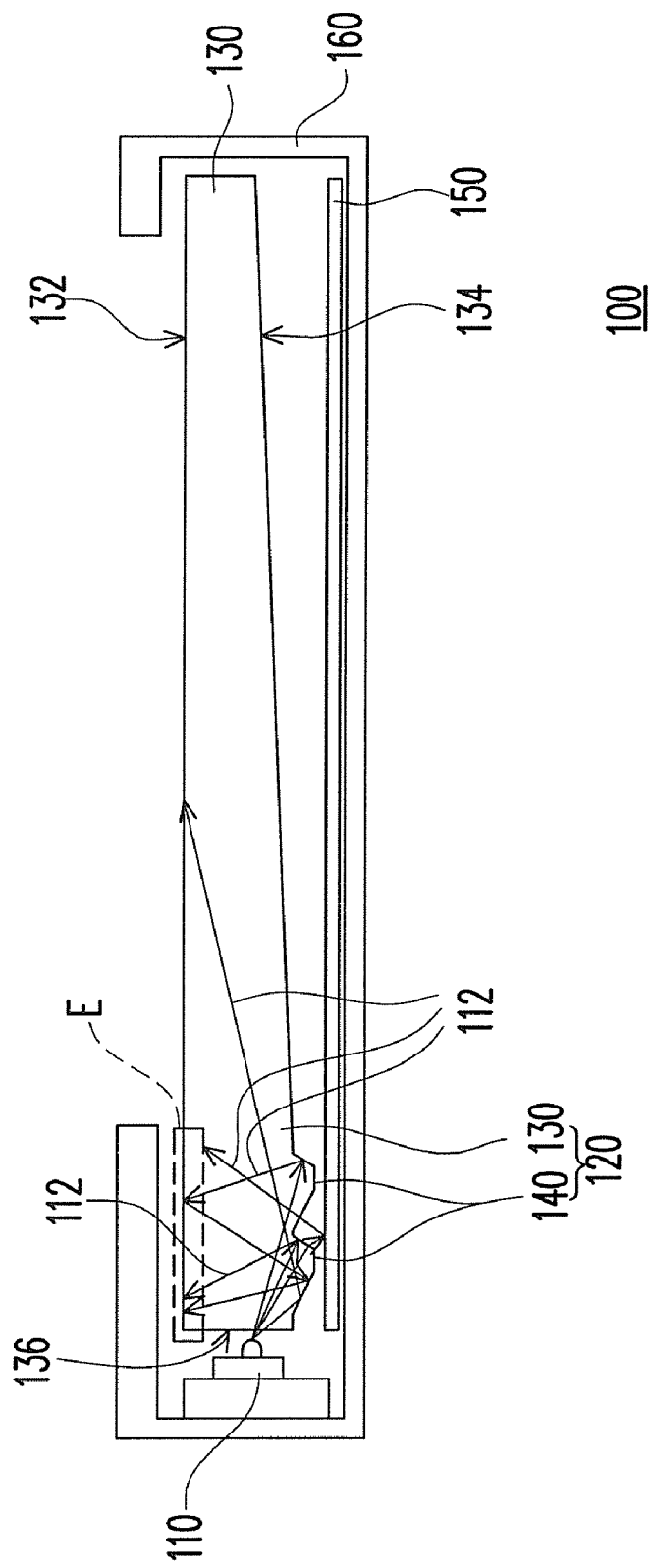
FIG. 1A is a cross-sectional view of a backlight module according to a first embodiment of the invention.
Figure 1B:
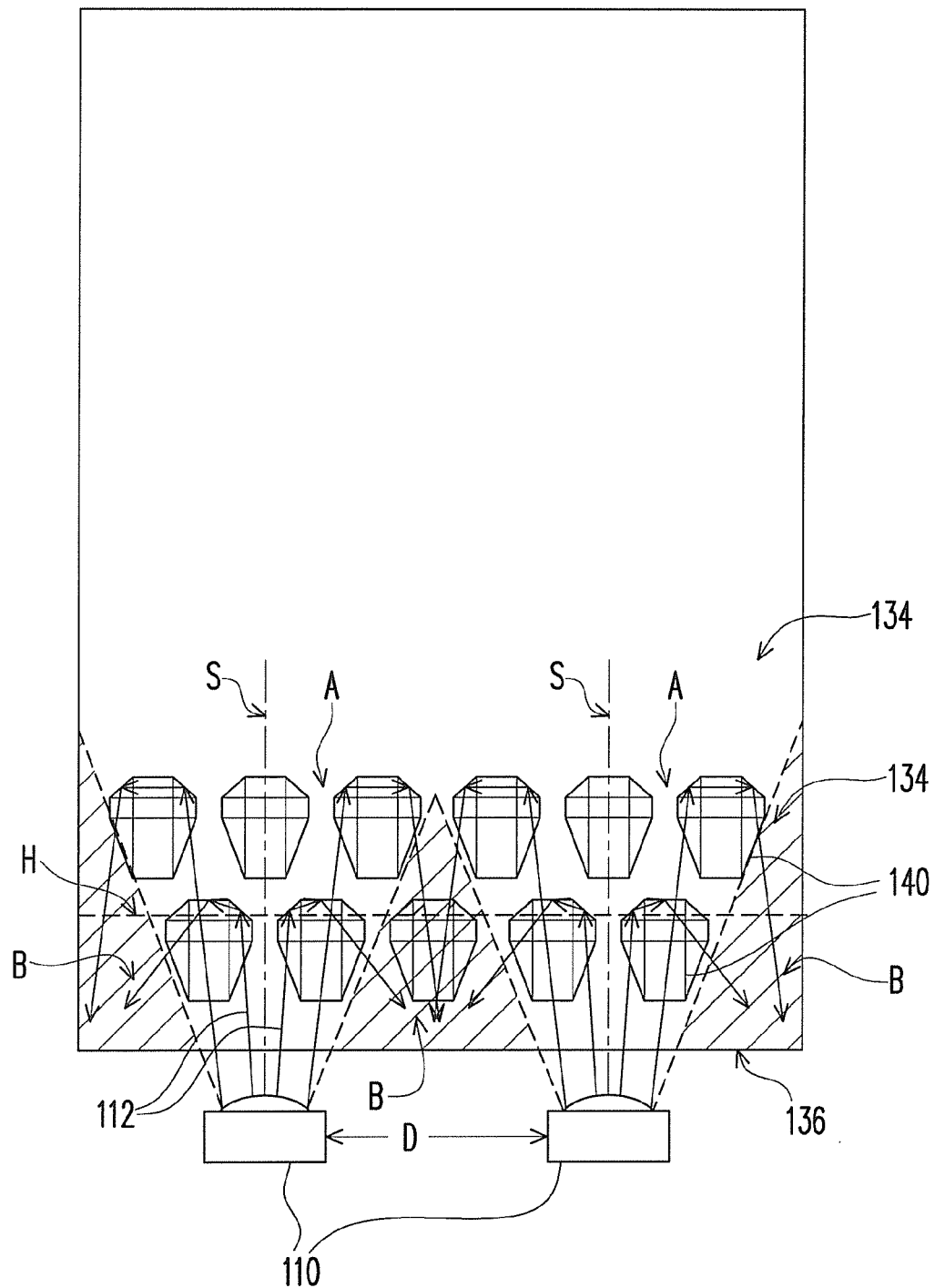
FIG. 1B is a bottom view of the backlight module in FIG. 1A after a frame and a reflector are removed.
Figure 2A:
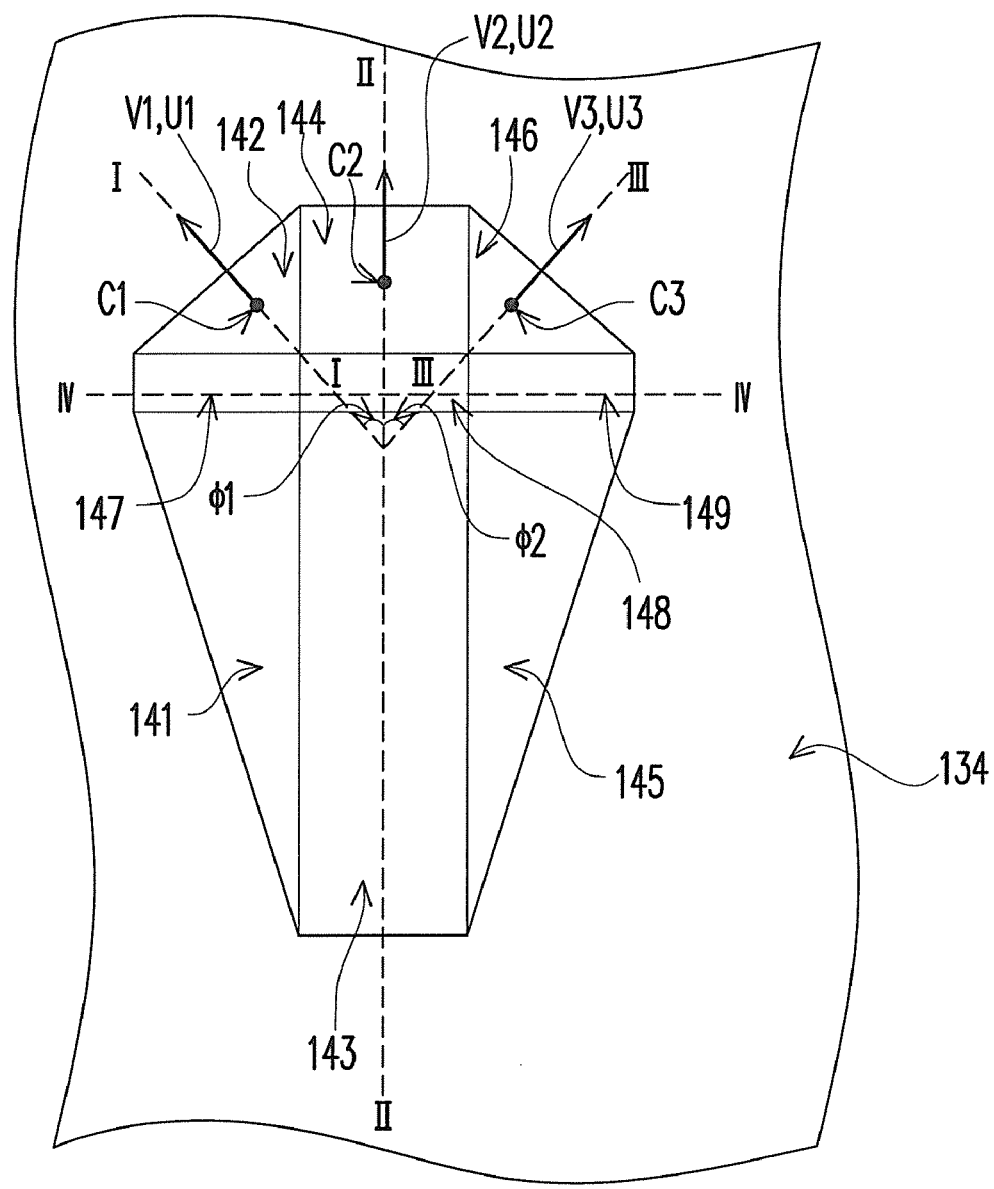
FIG. 2A is a bottom view of a part of a light guide plate in FIG. 1A.
Figure 2B:
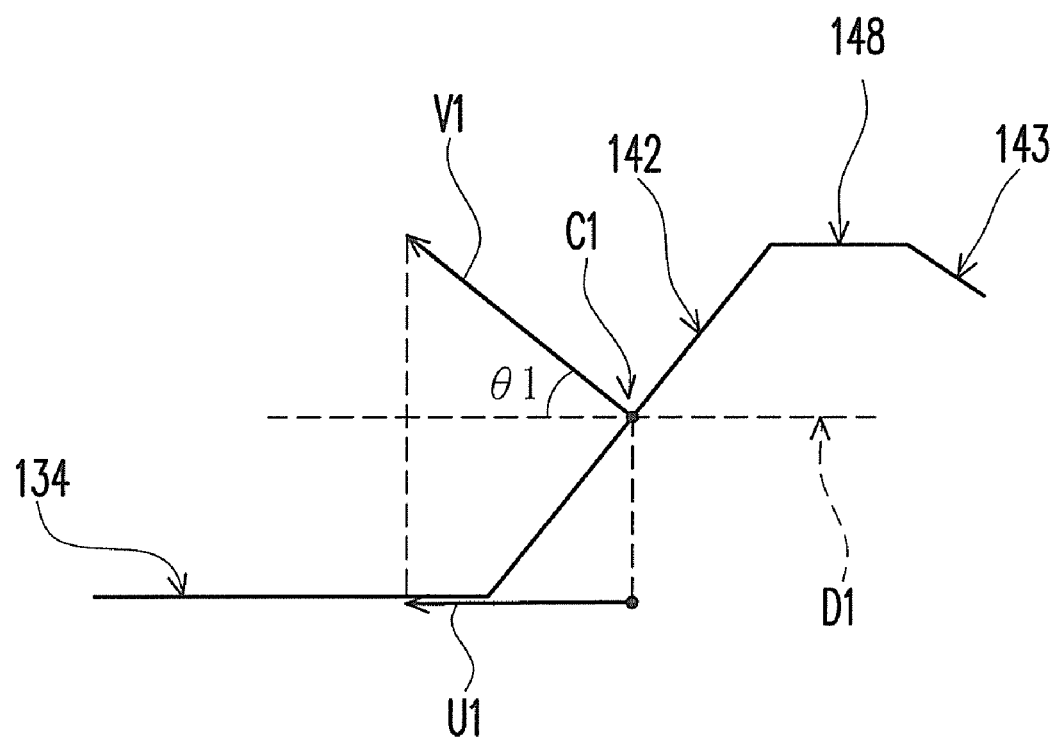
FIG. 2B is a partial cross-sectional view of an optical structure and a second surface in FIG. 2A along line I-I.
Figure 2C:
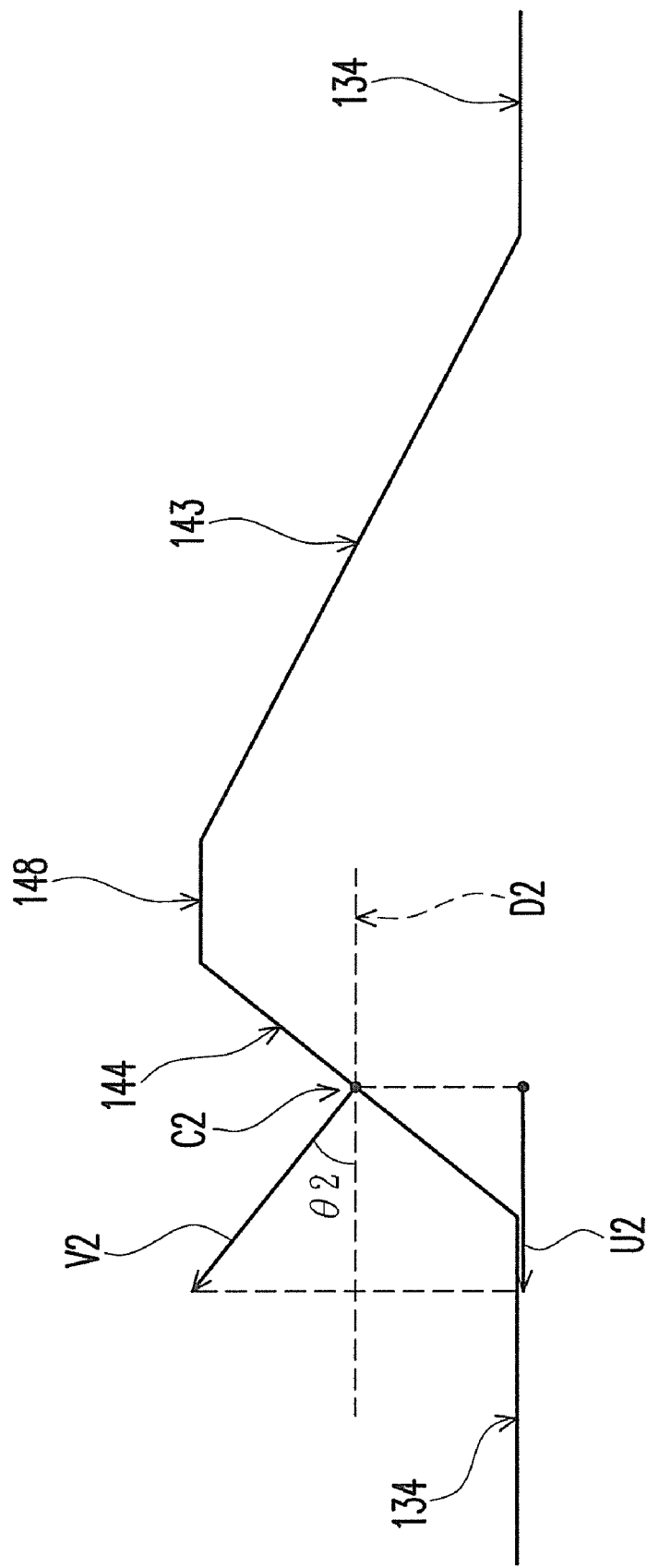
FIG. 2C is a cross-sectional view of the optical structure and the second surface in FIG. 2A along line II-II.
Figure 2D:
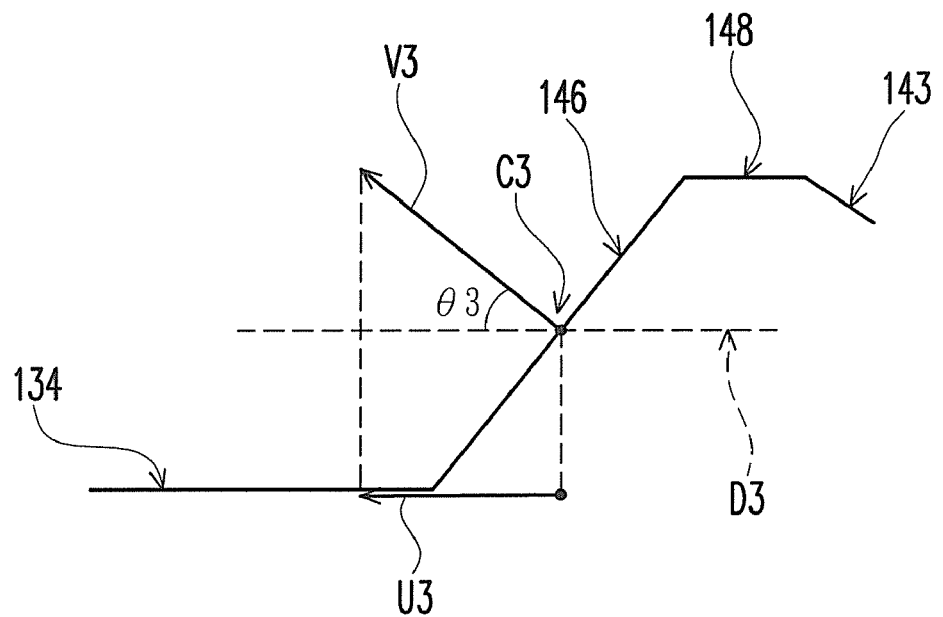
FIG. 2D is a partial cross-sectional view of the optical structure and the second surface in FIG. 2A along line III-III.

Referring to FIG. 1A, FIG. 1B, and FIG. 2A, in the embodiment, the backlight module 100 includes a plurality of light emitting devices 110 (two are illustrated in FIG. 1B) and a light guide plate 120. Each of the light emitting devices 110 is capable of emitting a light beam 112. In the embodiment, each of the light emitting devices 110 may be a light emitting diode (LED). The light guide plate 120 is disposed in the transmission path of the light beams 112 and is capable of guiding the light beams 112 emitted by the light emitting devices 110. The light guide plate 120 includes a light-transmissive substrate 130 and a plurality of optical structures 140. The light-transmissive substrate 130 has a first surface 132, a second surface 134 opposite to the first surface 132, and an incident surface 136 connecting the first surface 132 and the second surface 134. In the embodiment, the light emitting devices 110 are disposed beside the incident surface 136 of the light-transmissive substrate 130 and are kept a distance D from each other. Besides, since LEDs have directivity, in the embodiment, each of the light emitting devices 110 has a light emitting angle range A. The light beams 112 from the light emitting devices 110 enter the light-transmissive substrate 130 through the incident surface 136 and are emitted out of the light-transmissive substrate 130 through the first surface 132. The optical structures 140 are disposed on the second surface 134. Each of the optical structures 140 has a first total internal reflection (TIR) surface 142, a second TIR surface 144, and a third TIR surface 146, wherein the second TIR surface 144 connects the first TIR surface 142 and the third TIR surface 146. In the embodiment, each of the first TIR surface 142, the second TIR surface 144, and the third TIR surface 146 is a plane surface. In the embodiment, the optical structures 140 and the light-transmissive substrate 130 are formed integrally. However, in another embodiment of the invention, the optical structures and the light-transmissive substrate may also be individually formed.

Referring to FIGS. 2A-2D, a first normal vector V1 of the first TIR surface 142 passing through a geometric center C1 of the first TIR surface 142 forms an angle θ1 with the second surface 134, wherein the dotted line D1 is parallel to the second surface 134. A second normal vector V2 of the second TIR surface 144 passing through a geometric center C2 of the second TIR surface 144 forms an angle θ2 with the second surface 134, wherein the dotted line D2 is parallel to the second surface 134. A third normal vector V3 of the third TIR surface 146 passing through a geometric center C3 of the third TIR surface 146 forms an angle θ3 with the second surface 134, wherein the dotted line D3 is parallel to the second surface 134. The first TIR surface 142 meets $25° \leq θ1 \leq 65°$, the second TIR surface 144 meets $25° \leq θ2 \leq 65°$, and the third TIR surface 146 meets $25° \leq θ3 \leq 65°$.

Figure 3:
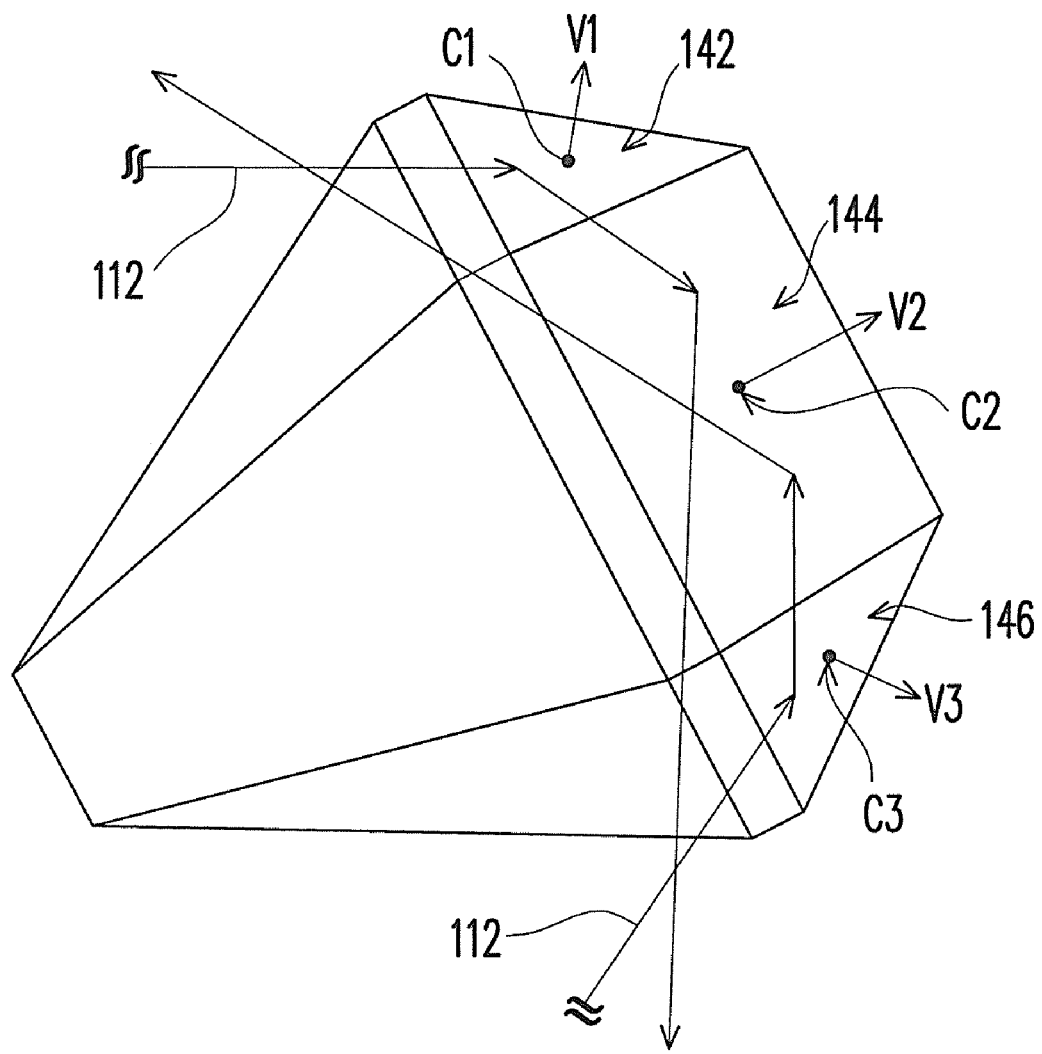
FIG. 3 is a diagram illustrating two total internal reflections of a light beam from an incident surface in the optical structure in FIG. 2A.

An orthogonal projection vector U1 of the first normal vector V1 on the second surface 134 forms an angle γ1 with an orthogonal projection vector U2 of the second normal vector V2 on the second surface 134, and the orthogonal projection vector U2 of the second normal vector V2 on the second surface 134 forms an angle φ2 with an orthogonal projection vector U3 of the third normal vector V3 on the second surface 134, wherein the first TIR surface 142 and the second TIR surface 144 meet $0 < φ1 \leq 30°$, and the second TIR surface 144 and the third TIR surface 146 meet $0 < φ2 \leq 30°$. In the present embodiment, $θ1 = θ3$, and $φ1 = φ2$. In other words, the first TIR surface 142 and the third TIR surface 146 of each of the optical structures 140 are symmetrical to each other. Referring to FIG. 3, part of the light beams 112 from the incident surface 136 is totally internally reflected by any adjacent two of the first TIR surface 142, the second TIR surface 144, and the third TIR surface 146 in sequence. To be specific, in the embodiment, the light beams 112 from the incident surface 136 are transmitted by way of the third TIR surface 146 and the second TIR surface 144 in sequence, and meanwhile, are totally internally reflected respectively by the third TIR surface 146 and the second TIR surface 144. In the embodiment, the light beams 112 may also be transmitted by way of the second TIR surface 144 and the third TIR surface 146 in sequence, and meanwhile, be totally internally reflected respectively by the second TIR surface 144 and third TIR surface 146. The light beams 112 may also be transmitted by way of the first TIR surface 142 and the second TIR surface 144 in sequence, and meanwhile, be totally internally reflected respectively by the first TIR surface 142 and the second TIR surface 144. Furthermore, the light beam 112 may also be transmitted by way of the second TIR surface 144 and the first TIR surface 142 in sequence, and meanwhile, be totally internally reflected respectively by the second TIR surface 144 and the first TIR surface 142.

In the embodiment, each of the optical structures 140 further includes a first optical surface 141, a third optical surface 145, and a second optical surface 143. The first optical surface 141 is connected to the first TIR surface 142 and opposite to the third TIR surface 146. The third optical surface 145 is connected to the third TIR surface 146 and opposite to the first TIR surface 142. The second optical surface 143 is connected to the second TIR surface 144 and connects the first optical surface 141 and the third optical surface 145.

Figure 2E:
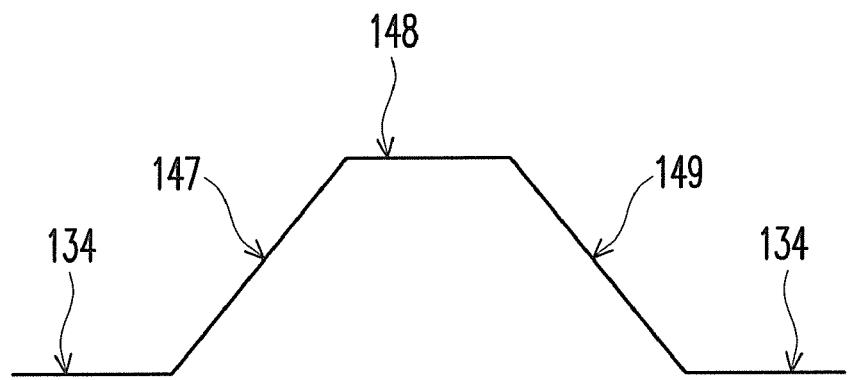
FIG. 2E is a cross-sectional view of the optical structure and the second surface in FIG. 2A along line IV-IV.

Referring to FIG. 2A and FIG. 2E, in the embodiment, each of the optical structures 140 further includes a fourth optical surface 147, a sixth optical surface 149, and a fifth optical surface 148. The fourth optical surface 147 connects the first TIR surface 142 and the first optical surface 141. The sixth optical surface 149 connects the third TIR surface 146 and the third optical surface 145 and is opposite to the fourth optical surface 147. The fifth optical surface 148 connects the second TIR surface 144 and the second optical surface 143 and connects the fourth optical surface 147 and the sixth optical surface 149, wherein the second TIR surface 144 and the second optical surface 143 are opposite to each other. In the embodiment, each of the first optical surface 141 the second optical surface 143, the third optical surface 145, the fourth optical surface 147, the fifth optical surface 148, and the sixth optical surface 149 is a plane surface. However, in another embodiment of the invention, each of these optical surfaces may also be a curved surface.

In another embodiment of the invention, each of the optical structures 140 may not have the fourth optical surface 147, the fifth optical surface 148, and the sixth optical surface 149, but first optical surface 141, the second optical surface 143, and the third optical surface 145 respectively directly connect with the first TIR surface 142, the second TIR surface 144, and the third TIR surface 146.

Referring to FIG. 1A, in the embodiment, the backlight module 100 further includes a reflector 150 disposed at one side of the second surface 134 to reflect the light beams 112 passing through the second surface 134 back to the light-transmissive substrate 130. Besides, in the embodiment, the backlight module 100 further includes a frame 160. The frame 160 covers a marginal region E of the first surface 132 adjacent to the light emitting devices 110, and the orthogonal projections of the optical structures 140 on the first surface 132 fall within the marginal region E. However, the invention is not limited that the orthogonal projections of the optical structures 140 on the first surface 132 have to fall within the marginal region E, and in another embodiment of the invention, the optical structures 140 may also be distributed within the entire second surface 134 and accordingly the orthogonal projections thereof on the first surface 132 may also be distributed within the entire first surface 132.

Referring to FIG. 1A and FIGS. 2A~2D, in the backlight module 100 of the embodiment, because a plurality of optical structures 140 are adopted in the light guide plate 120, and the first TIR surface 142, the second TIR surface 144, and the third TIR surface 146 in each of the optical structures 140 are disposed within a specific angle range (i.e., the angles θ1, θ2, θ3, φ1, and φ2 meet foregoing conditions), a part of the light beams 112 from the incident surface 136 is totally internally reflected by any adjacent two of the first TIR surface 142, the second TIR surface 144, and the third TIR surface 146 in sequence. Accordingly, referring to FIG. 1B and FIGS. 2A~2D, the optical structures 140 allow parts of the light beams 112 to bounce back to the areas in the light guide plate 120 close to the incident surface 136 and at both sides of the optical axes S of the light emitting devices 110. To be specific, the parts of the light beams 112 are reflected back to the area B in the light guide plate 120 outside of the light emitting angle range A, so that the brightness in the area B may be increased. Thereby, the problem of hot spot may be resolved and the uniformity of the surface light source provided by the backlight module 100 using the light guide plate 120 may be improved. In addition, the light emitting angle of the surface light source provided by the light guide plate 120 may be appropriately adjusted according to the user's requirement by adjusting the angles θ1, θ2, θ3, φ1, and φ2.

Figure 4:
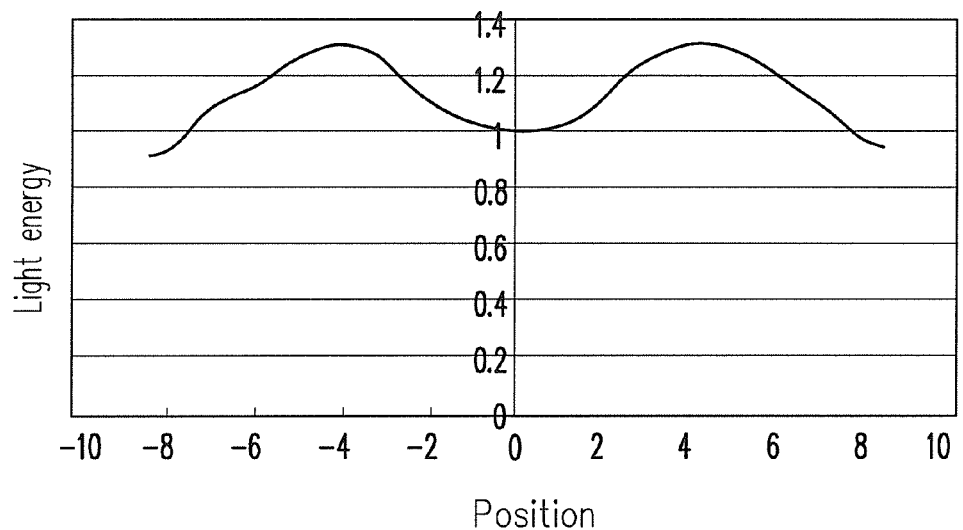
FIG. 4 illustrates the distribution of light energy on a cross section 3 mm away from an incident surface in a light guide plate of the backlight module in FIG. 1B.
Figure 5:
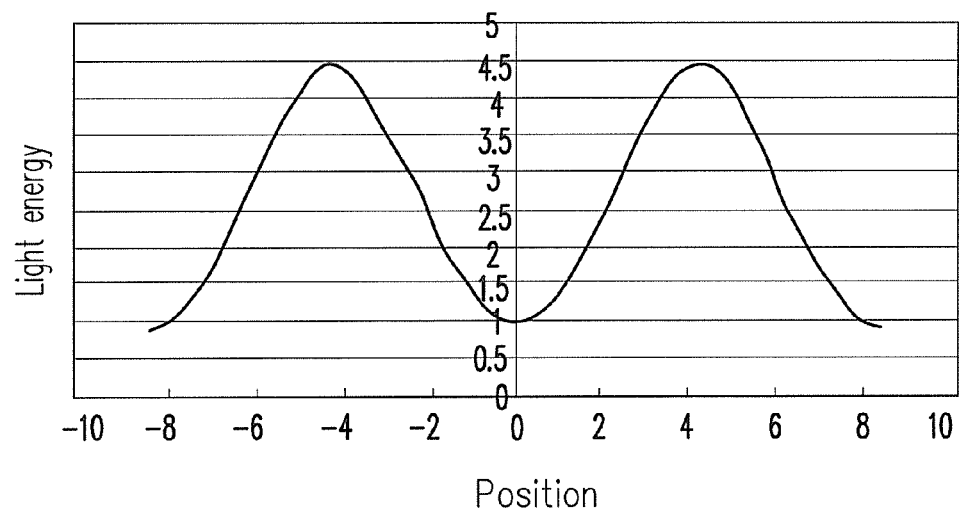
FIG. 5 illustrates the distribution of light energy on the cross section 3 mm away from the incident surface when the light guide plate in FIG. 1B is replaced with a light guide plate without optical structures 140.
Figure 6A:
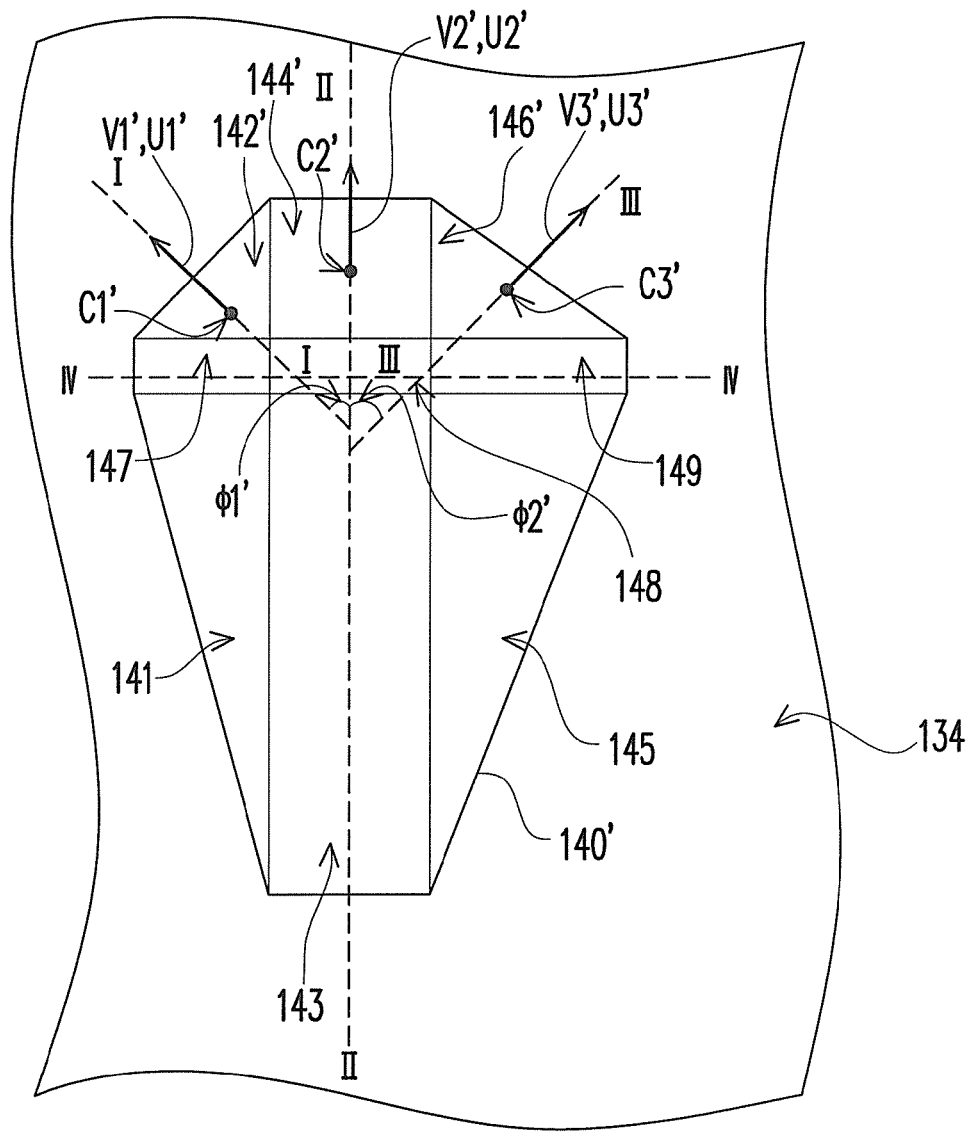
FIG. 6A is a bottom view of a part of a light guide plate in a backlight module according to a second embodiment of the invention.
Figure 6B:
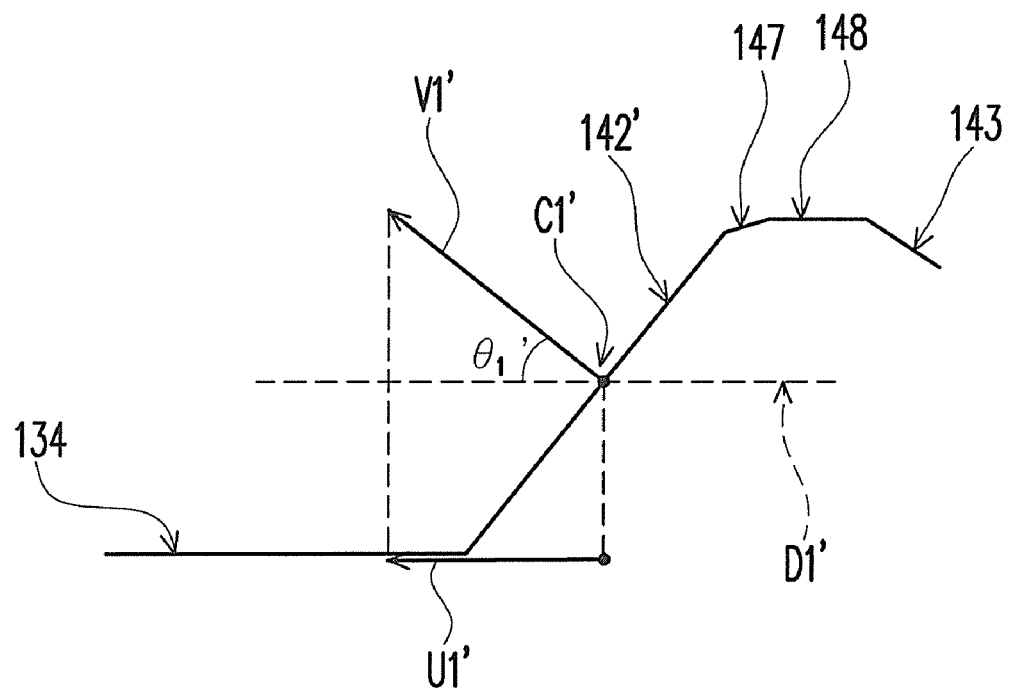
FIG. 6B is a partial cross-sectional view of an optical structure and a second surface in FIG. 6A along line I-I.
Figure 6C:
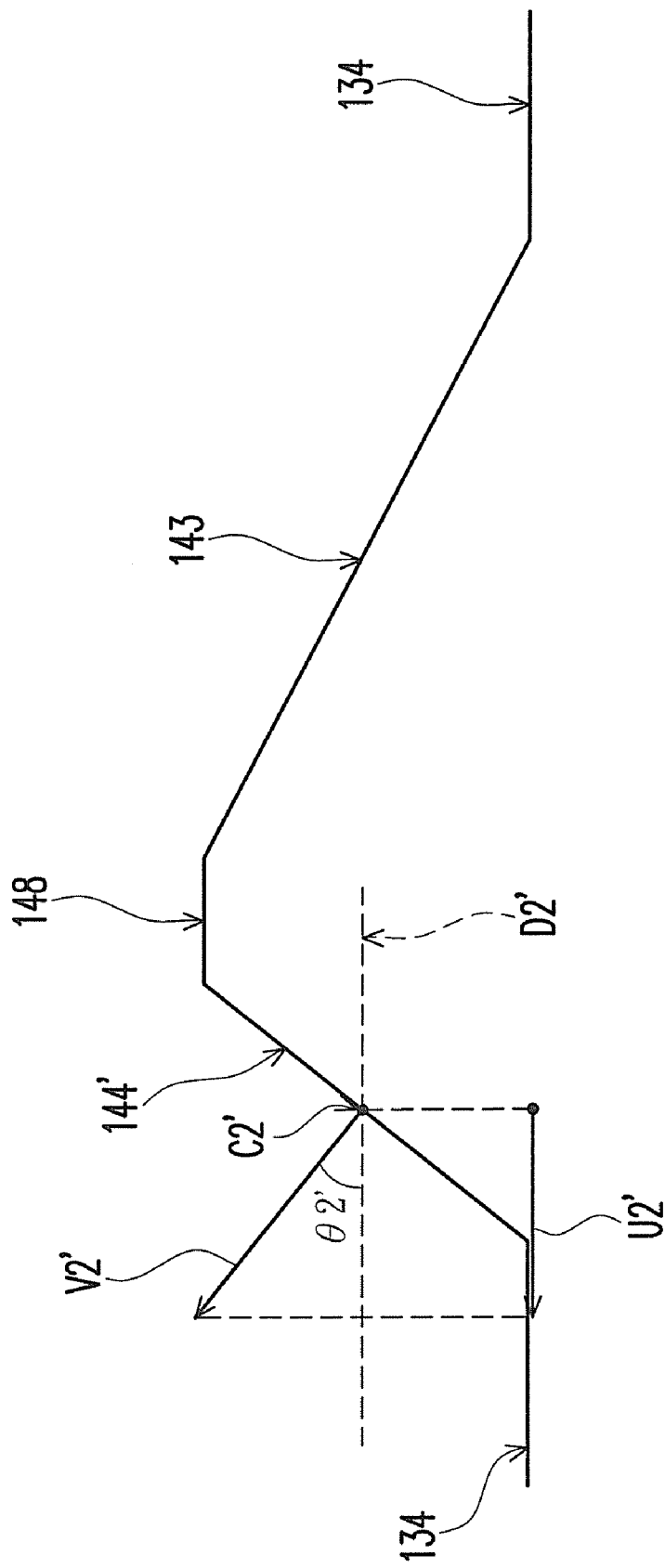
FIG. 6C is a cross-sectional view of the optical structure and the second surface in FIG. 6A along line II-II.
Figure 6D:
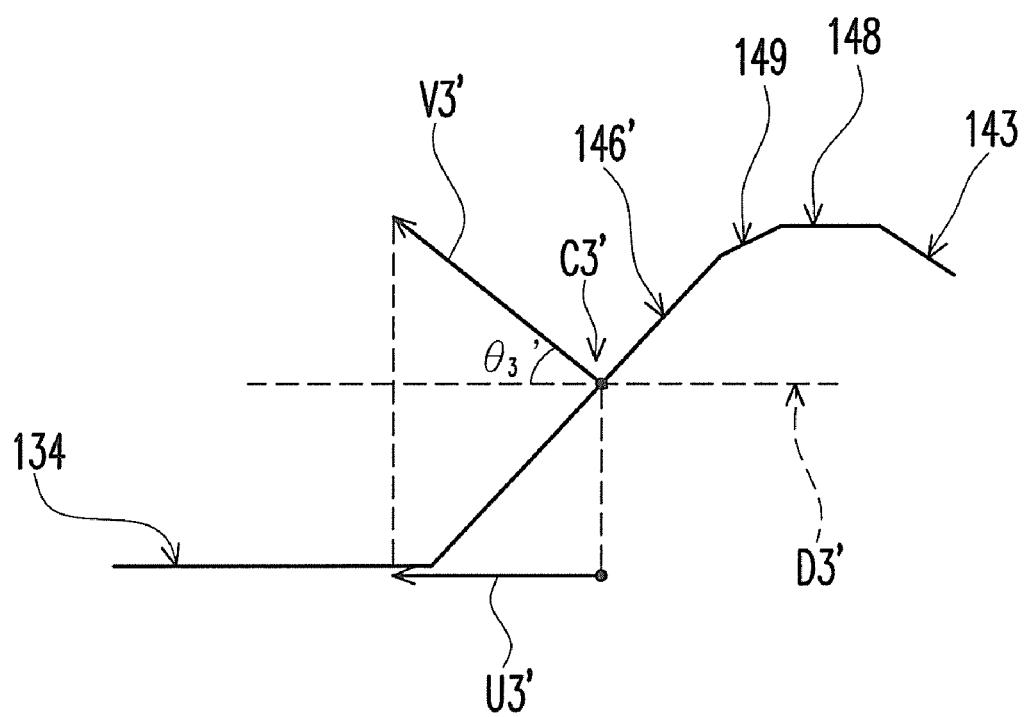
FIG. 6D is a partial cross-sectional view of the optical structure and the second surface in FIG. 6A along line III-III.

The performance of the light guide plate 120 in the embodiment is verified with two optical simulation graphs. Referring to FIG. 1B, FIG. 4, and FIG. 5, the abscissa indicates positions on the cross section H 3 mm away from the incident surface of the light guide plate, and the ordinate indicates the corresponding light energy, wherein the direction of the abscissa is parallel to the second surface 134 and the incident surface 136. As shown in FIG. 4 and FIG. 5, the light emitting devices 110 produce the highest light energy around the two positions corresponding to −4.1 and +4.1 on the abscissa, and these two positions are right in front of the light emitting devices 110. Besides, the light emitting devices 110 produce the lowest light energy between the positions corresponding to −4.1 and +4.1 on the abscissa around the position corresponding to 0 on the abscissa, and this position is right in front of the middle of the two light emitting devices 110. In FIG. 4, the ratio of the light energy at the position corresponding to ±4.1 to the light energy at the position corresponding to 0 on the abscissa is 1.3:1, while in FIG. 5, the ratio of the light energy at the position corresponding to ±4.1 to the light energy at the position corresponding to 0 on the abscissa is 4.5:1. Accordingly, the bright regions and dark regions formed in the backlight module 100 having the light guide plate 120 provided by the embodiment have lower brightness ratio (1.3:1), and the bright regions and dark regions formed in a backlight module having a light guide plate without the optical structures 140 have higher brightness ratio (4.5:1). Thereby, it is verified that the light guide plate 120 in the embodiment does help to resolve the hot spot problem and accordingly a more uniform surface light source may be provided by the backlight module 100 in the embodiment.

The optical simulation graph illustrated in FIG. 4 is not intended for limiting the invention, and in another embodiment of the invention or with other parameter values, different optical simulation graphs may also be obtained in the backlight module without departing from the spirit and scope of the invention.

Second Embodiment

Referring to FIGS. 6A-6D, the backlight module in the embodiment is similar to the backlight module 100 described above (as illustrated in FIG. 1A and FIGS. 2A~2D), and the difference between the two is described herein. In an optical structure 140' of the embodiment, a first normal vector V1' of a first TIR surface 142' passing through the geometric center C1' of the first TIR surface 142' forms an angle θ1' with the second surface 134, wherein the dotted line D1' is parallel to the second surface 134. A second normal vector V2' of a second TIR surface 144' passing through the geometric center C2' of the second TIR surface 144' forms an angle θ2' with the second surface 134, wherein the dotted line D2' is parallel to the second surface 134. A third normal vector V3' of the third TIR surface 146' passing through the geometric center C3' of the third TIR surface 146' forms an angle θ3' with the second surface 134, wherein the dotted line D3' is parallel to the second surface 134. In addition, the orthogonal projection vector U1' of the first normal vector V1' on the second surface 134 forms an angle φ1' with the orthogonal projection vector U2' of the second normal vector VT on the second surface 134, and the orthogonal projection vector U2' of the second normal vector V2' on the second surface 134 forms an angle φ2' with the orthogonal projection vector U3' of the third normal vector V3' on the second surface 134. Moreover, θ1'≠θ3' and φ1'≠φ2'. In other words, in the present embodiment, the first TIR surface 142' and the third TIR surface 146' in each of the optical structures 140' are not symmetrical to each other. The light emitting angle of the surface light source provided by the backlight module in the embodiment may be appropriately adjusted according to the user's requirement by adjusting the angles of the first TIR surface 142' and the third TIR surface 146' (i.e., the angles θ1', θ3', φ1', and φ2').

Third Embodiment

Figure 7:
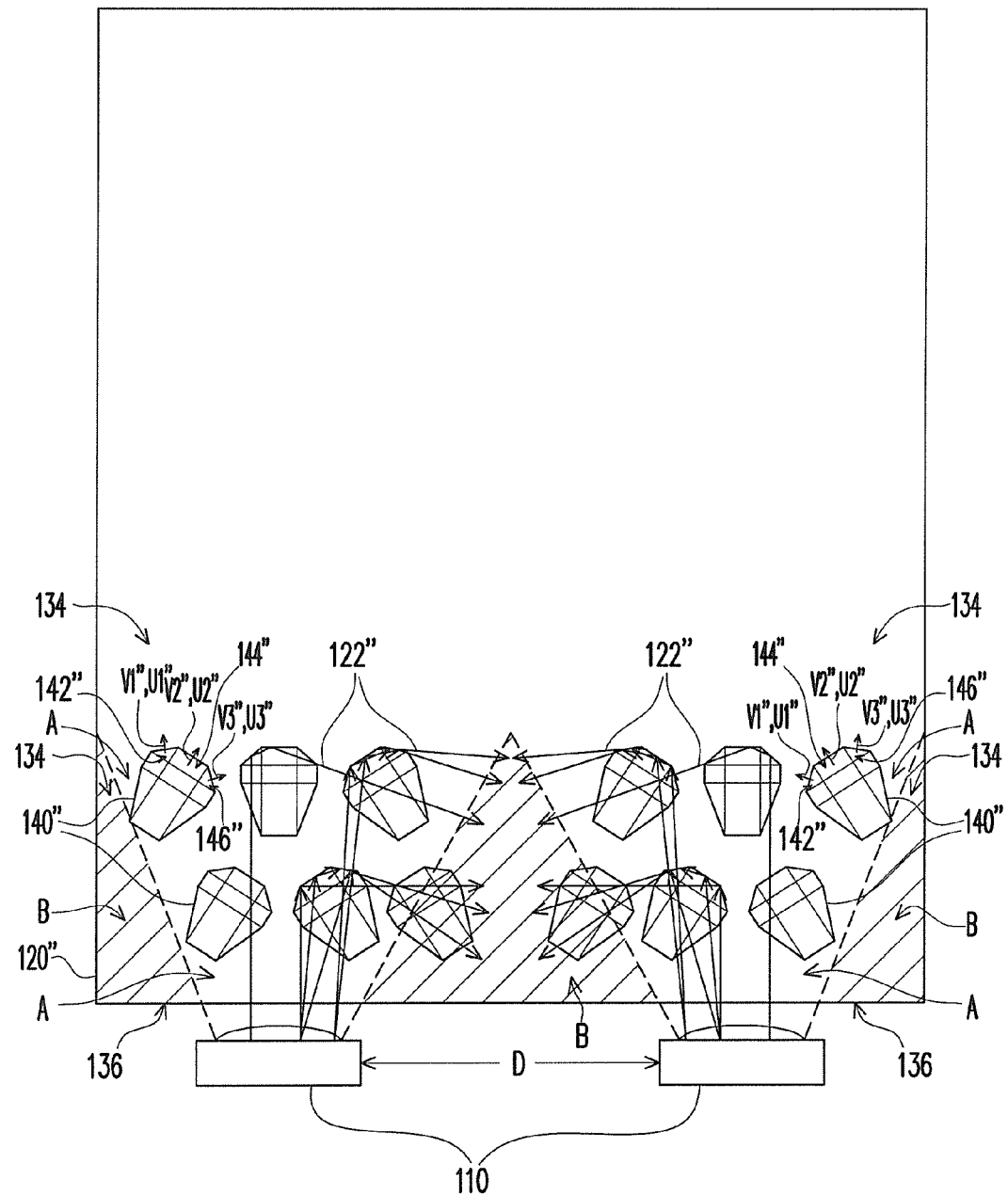
FIG. 7 is a bottom view of a backlight module after a frame and a reflector are removed according to a third embodiment of the invention.

Referring to FIG. 7, the backlight module in the embodiment is similar to the backlight module 100 described above (as illustrated in FIGS. 1A and 2A), and the difference between the two is described herein. In the backlight module provided by the embodiment, at least parts of the orthogonal projection vectors U1" of the first normal vectors V1" of the first TIR surfaces 142" of the optical structures 140" on the second surface 134 are not parallel to each other, at least parts of the orthogonal projection vectors U2" of the second normal vectors V2" of the optical structures 140" on the second surface 134 are not parallel to each other, and at least parts of the orthogonal projection vectors U3" of the third normal vectors V3" of the optical structures 140" on the second surface are not parallel to each other. In other words, compared with the above backlight module 100 in which the orthogonal projection vectors U1, U2, and U3 of the optical structures 140 are disposed toward the same directions, i.e., the disposition orientations of optical structures are the same, however in the present embodiment, the optical structures 140" in the backlight module are disposed toward different directions, namely, the optical structures 140 in foregoing backlight module 100 are turned to appropriate angles. As a result, at least part of the light beams 112" totally internally reflected by any adjacent two of the first TIR surface 142", the second TIR surface 144", and the third TIR surface 146" of each of the optical structures 140" is transmitted to the areas B outside of the light emitting angle ranges A of the light emitting devices 110 in the light guide plate 120", so that the hot spot problem may be effectively resolved and the uniformity of the surface light source provided by the backlight module in the present embodiment may be improved.

Fourth Embodiment

Figure 8:
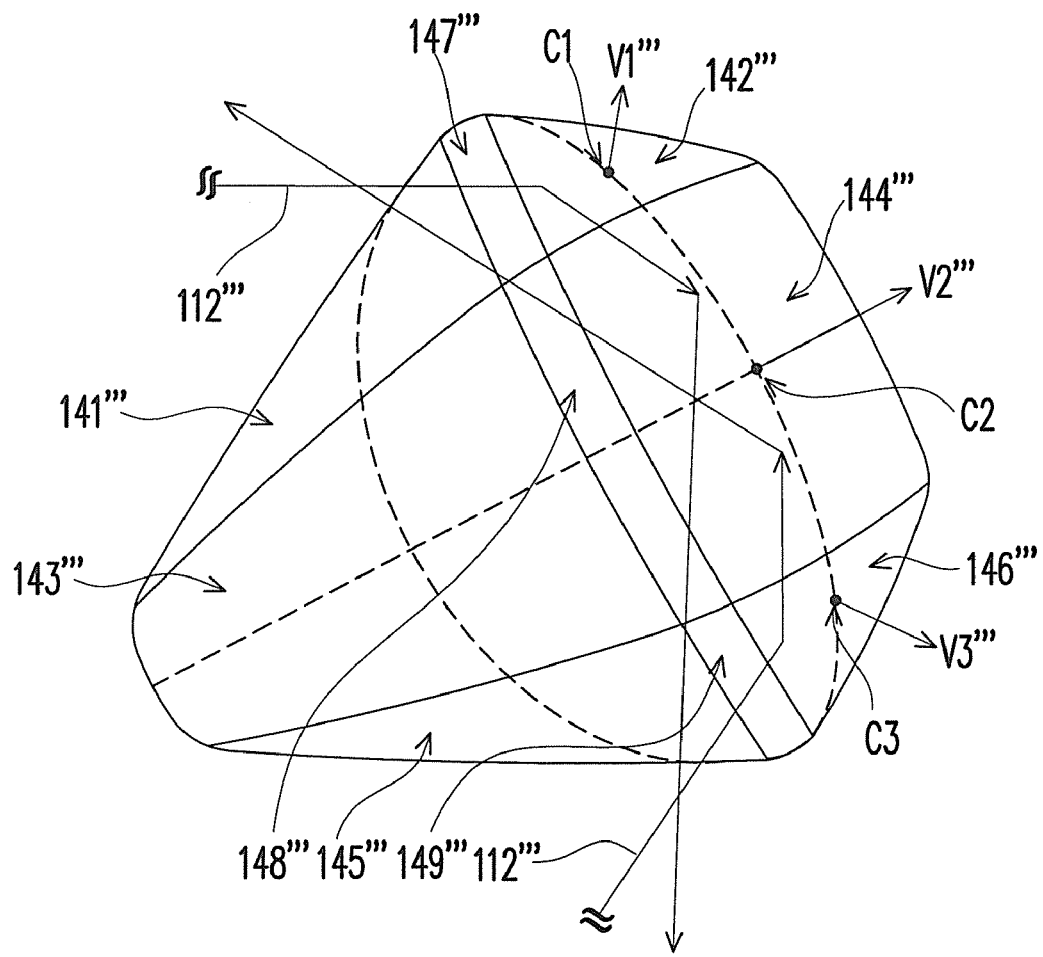
FIG. 8 is a diagram illustrating two total internal reflections of a light beam from an incident surface in an optical structure according to a fourth embodiment of invention.

Referring to FIG. 8, the backlight module in the embodiment is similar to the backlight module 100 described above, and the difference between the two is described herein. In the embodiment, each of the first TIR surface 142', the second TIR surface 144', and the third TIR surface 146' of each of the optical structures 140' may be a curved surface, wherein the first TIR surface 142' protrudes toward the same direction as the first normal vector V1', the second TIR surface 144' protrudes toward the same direction as the second normal vector V2', and the third TIR surface 146' protrudes toward the same direction as the third normal vector V3'. In the embodiment, the junction between the second TIR surface 144' and the first TIR surface 142' is smooth, and the junction between the second TIR surface 144''' and the third TIR surface 146' is also smooth. However, in another embodiment of the invention, the junction between the second TIR surface 144''' and the first TIR surface 142' may also be a non-smooth ridge line or a non-smooth concave line, and the junction between the second TIR surface 144''' and the third TIR surface 146''' may also be a non-smooth ridge line or a non-smooth concave line. Besides, in the present embodiment, a first optical surface 141''', a second optical surface 143', a third optical surface 145''', a fourth optical surface 147''', a fifth optical surface 148''', and a sixth optical surface 149''' are all curved surfaces. However, in another embodiment of the invention, these optical surfaces may also be plane surfaces.

As described above, the embodiment or the embodiments of the invention may have at least one of the following advantages. In the light guide plate according to the embodiments of the invention, a plurality of optical structures are adopted, and the first TIR surface, the second TIR surface, and the third TIR surface of each of the optical structures are disposed within a specific angle range (i.e., the angles θ1, θ2, θ3, φ1, and φ2 meet aforementioned conditions). Accordingly, part of the light beams from the incident surface is totally internally reflected by any adjacent two of the first TIR surface, the second TIR surface, and the third TIR surface in sequence. Thereby, the optical structures allow the part of the light beams to bounce back to the areas in the light guide plate close to the incident surface and at both sides of the optical axes of the light emitting devices. To be specific, the light beams are reflected back to the areas outside of the light emitting angle range of the light emitting devices, so that the brightness in the areas outside of the light emitting angle range may be increased. Thereby, the problem of hot spot is resolved, and the uniformity of the surface light source provided by a backlight module using the light guide plate is improved.

Moreover, the light emitting angle of the surface light source provided by the light guide plate may be appropriately adjusted according to the user's requirement by adjusting the angles θ1, θ2, θ3, φ1, and φ2.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate, capable of guiding a light beam emitted by at least one light emitting device, the light guide plate comprising:
    a light-transmissive substrate, having a first surface, a second surface opposite to the first surface, and an incident surface connecting the first surface and the second surface, wherein the light beam from the light emitting device is capable of entering the light-transmissive substrate through the incident surface and is capable of being emitted out of the light-transmissive substrate through the first surface; and
    a plurality of optical structures, disposed on the second surface, each of the optical structures having a first total internal reflection (TIR) surface, a second TIR surface, and a third TIR surface, wherein the second TIR surface connects the first TIR surface and the third TIR surface, a first normal vector of the first TIR surface passing through a geometric center of the first TIR surface forms an angle θ1 with the second surface, a second normal vector of the second TIR surface passing through a geometric center of the second TIR surface forms an angle θ2 with the second surface, and a third normal vector of the third TIR surface passing through a geometric center of the third TIR surface forms an angle θ3 with the second surface, wherein the first TIR surface meets $25° \leq θ1 \leq <65°$, the second TIR surface meets $25° \leq θ2 \leq 65°$, and the third TIR surface meets $25° \leq θ3 \leq 65°$, an orthogonal projection vector of the first normal vector on the second surface forms an angle φ1 with an orthogonal projection vector of the second normal vector on the second surface, and the orthogonal projection vector of the second normal vector on the second surface forms an angle φ2 with an orthogonal projection vector of the third normal vector on the second surface, wherein the first TIR surface and the second TIR surface meet $0<φ1 \leq 30°$, and the second TIR surface and the third TIR surface meet $0<φ2 \leq 30°$,
    wherein a part of the light beam from the incident surface is capable of being totally internally reflected by any adjacent two of the first TIR surface, the second TIR surface, and the third TIR surface in sequence.

2. The light guide plate according to claim 1, wherein each of the first TIR surface, the second TIR surface, and the third TIR surface is a plane surface.

3. The light guide plate according to claim 1, wherein each of the first TIR surface, the second TIR surface, and the third TIR surface is a curved surface.

4. The light guide plate according to claim 3, wherein the first TIR surface protrudes toward a same direction as the first normal vector, the second TIR surface protrudes toward a same direction as the second normal vector, and the third TIR surface protrudes toward a same direction as the third normal vector.

5. The light guide plate according to claim 1, wherein at least parts of the orthogonal projection vectors of the first normal vectors of the optical structures on the second surface are not parallel to each other, at least parts of the orthogonal projection vectors of the second normal vectors of the optical structures on the second surface are not parallel to each other, and at least parts of the orthogonal projection vectors of the third normal vectors of the optical structures on the second surface are not parallel to each other.

6. The light guide plate according to claim 1, wherein θ1=θ3 and φ1=φ2.

7. The light guide plate according to claim 1, wherein θ1≠θ3 and φ1≠φ2.

8. The light guide plate according to claim 1, wherein each of the optical structures further comprises:
    a first optical surface, connected to the first TIR surface, and opposite to the third TIR surface;
    a third optical surface, connected to the third TIR surface, and opposite to the first TIR surface; and a second optical surface, connected to the second TIR surface, and connecting the first optical surface and the third optical surface.

9. The light guide plate according to claim 8, wherein each of the optical structures further comprises:
   a fourth optical surface, connecting the first TIR surface and the first optical surface;
   a sixth optical surface, connecting the third TIR surface and the third optical surface, and opposite to the fourth optical surface; and
   a fifth optical surface, connecting the second TIR surface and the second optical surface, and connecting the fourth optical surface and the sixth optical surface, wherein the second TIR surface and the second optical surface are opposite to each other.

10. A backlight module, comprising:
    two light emitting devices, wherein each of the light emitting devices is capable of emitting a light beam; and
    a light guide plate, disposed in a transmission path of the light beams, the light guide plate comprising:
       a light-transmissive substrate, having a first surface, a second surface opposite to the first surface, and an incident surface connecting the first surface and the second surface, wherein the light beams from the light emitting devices are capable of entering the light-transmissive substrate through the incident surface and are capable of being emitted out of the light-transmissive substrate through the first surface; and
       a plurality of optical structures, disposed on the second surface, each of the optical structures having a first TIR surface, a second TIR surface, and a third TIR surface, wherein the second TIR surface connects the first TIR surface and the third TIR surface, a first normal vector of the first TIR surface passing through a geometric center of the first TIR surface forms an angle $\theta 1$ with the second surface, a second normal vector of the second TIR surface passing through a geometric center of the second TIR surface forms an angle $\theta 2$ with the second surface, and a third normal vector of the third TIR surface passing through a geometric center of the third TIR surface forms an angle $\theta 3$ with the second surface, wherein the first TIR surface meets $25° \leq \theta 1 \leq 65°$, the second TIR surface meets $25° \leq \theta 2 \leq 65°$, and the third TIR surface meets $25° \leq \theta 3 \leq 65°$, an orthogonal projection vector of the first normal vector on the second surface forms an angle $\phi 1$ with an orthogonal projection vector of the second normal vector on the second surface, and the orthogonal projection vector of the second normal vector on the second surface forms an angle $\phi 2$ with an orthogonal projection vector of the third normal vector on the second surface, wherein the first TIR surface and the second TIR surface meet $0<\phi 1 \leq 30°$, and the second TIR surface and the third TIR surface meet $0<\phi 2 \leq 30°$,
    wherein a part of the light beams from the incident surface is capable of being totally internally reflected by any adjacent two of the first TIR surface, the second TIR surface, and the third TIR surface in sequence.

11. The backlight module according to claim 10, wherein each of the first TIR surface, the second TIR surface, and the third TIR surface is a plane surface.

12. The backlight module according to claim 10, wherein each of the first TIR surface, the second TIR surface, and the third TIR surface is a curved surface.

13. The backlight module according to claim 12, wherein the first TIR surface protrudes toward a same direction as the first normal vector, the second TIR surface protrudes toward a same direction as the second normal vector, and the third TIR surface protrudes toward a same direction as the third normal vector.

14. The backlight module according to claim 10, wherein at least parts of the orthogonal projection vectors of the first normal vectors of the optical structures on the second surface are not parallel to each other, at least parts of the orthogonal projection vectors of the second normal vectors of the optical structures on the second surface are not parallel to each other, and at least parts of the orthogonal projection vectors of the third normal vectors of the optical structures on the second surface are not parallel to each other.

15. The backlight module according to claim 10, wherein $\theta 1 = \theta 3$ and $\phi 1 = \phi 2$.

16. The backlight module according to claim 10, wherein $\theta 1 \neq \theta 3$ and $\phi 1 \neq \phi 2$.

17. The backlight module according to claim 10, wherein each of the optical structures further comprises:
    a first optical surface, connected to the first TIR surface, and opposite to the third TIR surface;
    a third optical surface, connected to the third TIR surface, and opposite to the first TIR surface; and
    a second optical surface, connected to the second TIR surface, and connecting the first optical surface and the third optical surface.

18. The backlight module according to claim 17, wherein each of the optical structures further comprises:
    a fourth optical surface, connecting the first TIR surface and the first optical surface;
    a sixth optical surface, connecting the third TIR surface and the third optical surface, and opposite to the fourth optical surface; and
    a fifth optical surface, connecting the second TIR surface and the second optical surface, and connecting the fourth optical surface and the sixth optical surface, wherein the second TIR surface and the second optical surface are opposite to each other.

19. The backlight module according to claim 10, wherein the light emitting devices are disposed beside the incident surface and are kept a distance away from each other, each of the light emitting devices has a light emitting angle range, and at least a part of the light beams totally internally reflected by any adjacent two of the first TIR surface, the second TIR surface, and the third TIR surface of each of the optical structures is transmitted to areas outside of the light emitting angle ranges of the light emitting devices in the light guide plate.

20. The backlight module according to claim 10 further comprising a frame, wherein the frame covers a marginal region of the first surface adjacent to the light emitting devices, and orthogonal projections of the optical structures on the first surface fall within the marginal region.

* * * * *